United States Patent
Shida et al.

[11] Patent Number: 5,733,085
[45] Date of Patent: Mar. 31, 1998

[54] FASTENER ASSEMBLY AND ADHESIVE COMPOSITION

[75] Inventors: Mitsuzo Shida; William L. Gabriel, both of Barrington; Geronimo E. Lat, Prospect Heights, all of Ill.

[73] Assignee: Illinois Tool Works, Inc., Glenview, Ill.

[21] Appl. No.: 693,357

[22] Filed: Aug. 6, 1996

[51] Int. Cl.$^6$ .................. F16B 15/08; F16B 39/00
[52] U.S. Cl. .................. 411/442; 411/966; 206/345
[58] Field of Search .................. 411/442, 443, 411/444, 966; 206/343, 344, 345, 346

[56] References Cited

U.S. PATENT DOCUMENTS

| | | | |
|---|---|---|---|
| 3,294,303 | 12/1966 | Anstett | 27/95 |
| 3,358,822 | 12/1967 | O'Connor | 411/442 X |
| 3,491,389 | 1/1970 | Leistner | |
| 3,736,198 | 5/1973 | Leistner | 156/65 |
| 3,927,459 | 12/1975 | Haytayan | 29/413 |
| 3,944,067 | 3/1976 | Bakoledis | 206/347 |
| 3,954,176 | 5/1976 | Haytayan | 206/347 |
| 4,047,611 | 9/1977 | Damratowski | 206/347 |
| 4,106,618 | 8/1978 | Haytayan | 206/343 |
| 4,298,121 | 11/1981 | Oide et al. | 206/347 |
| 4,343,579 | 8/1982 | Shelton et al. | 411/442 |
| 4,483,280 | 11/1984 | Nikolich | 123/46 |
| 4,522,162 | 6/1985 | Nikolich | 123/46.5 |
| 4,718,551 | 1/1988 | Whitledge | 206/347 |
| 4,836,372 | 6/1989 | Shelton | 411/442 X |
| 4,881,643 | 11/1989 | Pfister | 206/343 |
| 4,932,821 | 6/1990 | Steffen et al. | 411/442 |
| 5,005,699 | 4/1991 | Kawashima et al. | 206/344 |
| 5,069,340 | 12/1991 | Ernst et al. | 206/347 |

FOREIGN PATENT DOCUMENTS 0 297 156  1/1989  European Pat. Off. .

*Primary Examiner*—Neill R. Wilson
*Attorney, Agent, or Firm*—Speckman Pauley Petersen & Fejer

[57] ABSTRACT

A fastener assembly, such as a nail assembly, includes a row of fasteners held together and maintained in position by an extrudable thermoplastic adhesive composition containing a particulate filler, an extrudable thermoplastic resin reacted with a polar compound, and optional quantities of an additional thermoplastic resin. The adhesive composition provides the fastener assembly with increased rigidity, reduced bending and buckling, and reduced shearing requirements for separating an individual fastener from the row. The invention also includes an adhesive composition useful in the fastener assembly.

26 Claims, 1 Drawing Sheet

FASTENER ASSEMBLY AND ADHESIVE COMPOSITION

BACKGROUND OF THE INVENTION

This invention relates to fastener assemblies, including nail assemblies, for use in rapid-acting fastener driving tools. This invention also includes an adhesive composition used to bond the fasteners (including nails) together in the assemblies.

Fast-acting fastener driving tools are commonplace in the building industry. Fasteners, such as nails, are assembled in strips that are adapted for use in the magazine of such tools. The strips are flat, the nails or other fasteners are parallel, and the fasteners are maintained in position using an adhesive.

An important component of fastener assemblies is the adhesive used to secure the fasteners in the strip. As shown in FIGS. 1 and 2, for instance, a film or band of an extrudable polymer adhesive may be applied across a portion of each fastener's shank and in between the fasteners, such that the shanks are held in parallel alignment. Often, the adhesive is applied to both sides of the fastener to impart greater rigidity to the fastener assembly. As shown in FIGS. 1 and 2, the adhesive may be overlaid and reinforced with a backing member, which can be a paper strip.

Some important properties of the extrudable adhesive are as follows. First, the adhesive or "sticking" properties must be strong enough so that the adhesive film tears between nails, but does not separate from the nails, when the nails are injected into wood. This property alleviates a prior art phenomenon known as "flagging" wherein pieces of adhesive separated from the nails during injection would protrude outward from the injection point, causing the object under construction to have a less pleasing appearance.

Second, the adhesive must have a sufficient film strength and stiffness to hold the nails together in a flat, parallel strip assembly. To some extent, the strength and stiffness can be increased by increasing the thickness of the adhesive film, or by shortening the distance between the adjacent nails. However, the film strength should not be so great as to unnecessarily multiply the energy requirement needed to separate a nail from the strip using the nail gun. Also, the adhesive itself can be expensive, and this factor may limit the amount of adhesive which can economically be used.

There is a trend in the construction industry toward the use of higher speed nail guns which 1) inject individual nails into wood at a faster pace, and 2) move the nail assembly strip forward in the magazine of the tool more rapidly so that individual nails can be injected more frequently, with lower cycle times. To move a nail assembly forward in the magazine, pressure is applied in the direction of the arrow A shown in FIG. 1, at the tail end of the band of nails. To inject each nail into wood, a driving force is applied at the head of each nail, as shown by the arrow B.

To increase the velocity in the magazine, the pressure at A must be increased. However, when the pressure and velocity are increased, there is an increased tendency toward bending and buckling of the previously flat band of nails, causing unacceptable misalignment of the nails before they reach position B. For the reasons stated above, this bending and buckling can only be avoided to a limited extent by increasing the adhesive film thickness or moving the nails closer together. Hence, the ability to move nails forward at a faster rate has been limited thus far.

SUMMARY OF THE INVENTION

The present invention includes a fastener assembly having increased rigidity and greater ability to resist bending and buckling, without increasing the amount and cost of the adhesive component. The present invention also includes an improved extrudable adhesive composition for use in a fastener assembly, such as a nail assembly.

The fastener assembly (e.g. nail assembly) of the invention can have essentially the same shape and configuration previously known as illustrated, for example, in FIGS. 1 and 2. However, the invention makes use of a novel extrudable thermoplastic adhesive composition. The adhesive composition includes the following components:

a) an extrudable polymer backbone reacted with a polar functional moiety, b) 3–75%, based on the weight of the adhesive composition, of a particulate filler material, and c) optionally, an additional quantity of thermoplastic extrudable polyolefin material.

The adhesive composition, when optimized and used in a fastener assembly, increases the rigidity and stiffness of the assembly without causing an undesirable increase in film strength, without requiring greater film thickness, without increasing the cost of the assembly, and sometimes decreasing the cost of the assembly.

With the foregoing in mind, it is a feature and advantage of the invention to provide a fastener assembly, including a nail assembly, which can withstand greater pressure and travel at greater speed in a magazine, without bending or buckling.

It is also a feature and advantage of the invention to provide a fastener assembly having excellent rigidity and stiffness without excessive film strength in the adhesive component.

It is also a feature and advantage of the invention to provide a fastener assembly in which the adhesive film exhibits excellent adhesion to the nails or other metal fasteners in the assembly.

It is also a feature and advantage of the invention to provide a thermoplastic extrudable filled adhesive composition which imparts the foregoing advantages to a fastener assembly, including a nail assembly.

These and other features and advantages of the invention will become further apparent from the following detailed description of the presently preferred embodiments, read in conjunction with the accompanying examples and drawings. The detailed description, examples and drawings are intended to be illustrative rather than limiting, with the scope of the invention being defined by the appended claims and equivalents thereof.

DETAILED DESCRIPTION OF THE PRESENTLY PREFERRED EMBODIMENTS

Figure 1:
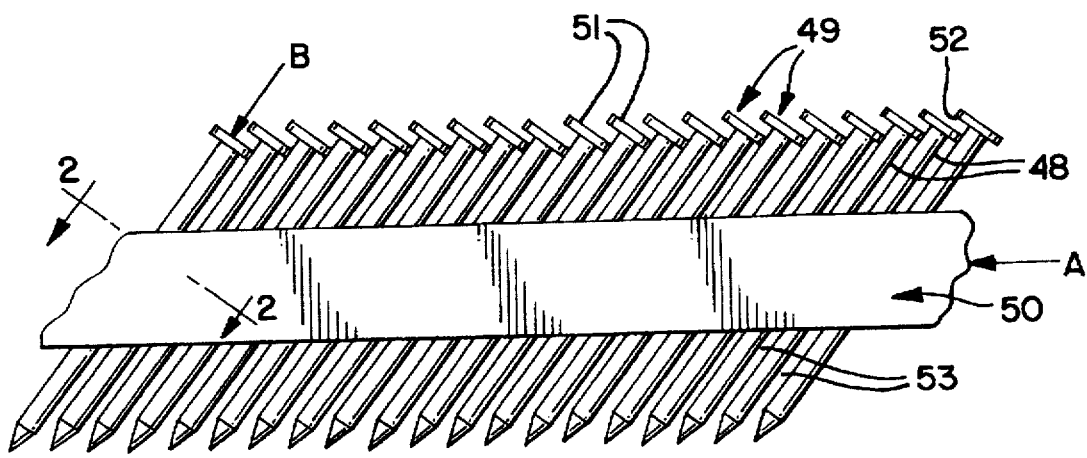
FIG. 1 is a top plan view of a nail assembly according to the invention, whose outward appearance is essentially unchanged from the prior art.
Figure 2:
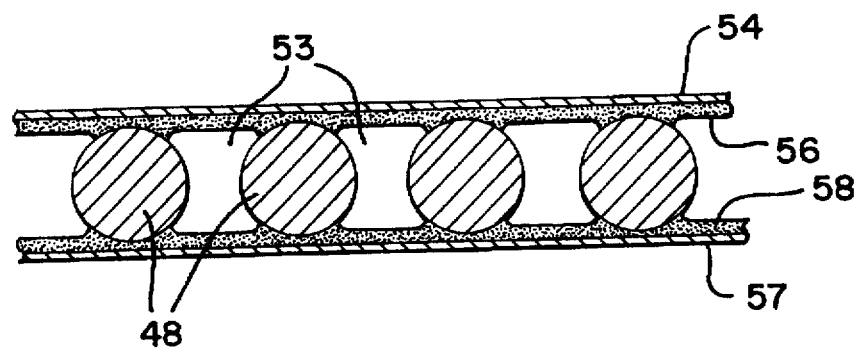
FIG. 2 is a sectional view of a nail assembly according to the invention, taken along the line 2—2 in FIG. 1.

Referring to FIGS. 1 and 2, a nail assembly, generally designated as 50, is arranged in a flat planar configuration with its nails parallel to each other. The nail assembly includes two essential components, a plurality of nails 49 and at least one (preferably two) adhesive layers 56 and 58 bonded to the nails and holding them in a parallel configuration with spaces 53 between the nails. In the preferred embodiment shown, the two adhesive layers 56 and 58 sandwich the row of nails between the layers.

The adhesive layers 56 and 58 can be covered on their outer surfaces by backing layers 54 and 57, preferably constructed of paper or brittle plastic. The backing layers can be used to reinforce the adhesive layers 56 and 58, and can also be used for printing and labelling. A preferred backing layer is brown kraft paper, which is strong and tends to blend in with the color of the wood being penetrated by the nails.

Each of the nails 49 has a head portion 51 and a shank portion 48. As shown in FIG. 1, the head portions 51 of adjacent nails partially overlap each other. Furthermore, the head portion 51 of each leading nail preferably touches the shank 48 of the closest trailing nail, in order to help maintain the alignment of the nails.

The nails 49 are slanted relative to the adhesive film strips 56 and 58, and backings 54 and 57, as shown in FIG. 1. The degree of slanting is between about 10–40 degrees, preferably about 15–25 degrees, where a zero degree slant is perpendicular to the adhesive tape. This slanting is what permits the head portions 51 to overlap when the nails are in uniform parallel alignment. By overlapping the heads 51, the distance between the adjacent nail shanks 48 can be less than would be required if the nails were aligned perpendicular to the adhesive and backing layers with the respective head portions positioned edge to edge. The distance between shanks 48 can be further reduced by providing the nail heads 51 with a truncated circular shape (e.g. a half circle or three-quarter circle with a flat edge) instead of making them completely round.

The nails (or other fasteners) can be constructed of any metal commonly used for fasteners, including steel, cooper, aluminum, zinc and various other metals and metal alloys. As explained below, the adhesive employs a polar functionality which chemically reacts with a thin oxide coating appearing on the surfaces of most metals. Therefore, any metal or alloy which forms an oxide on its surface, and which is suitable for fasteners, can be employed in the fasteners in this invention.

The adhesive composition used in the invention includes an active ingredient based on an extrudable polymer or copolymer backbone which has been grafted or otherwise reacted with a polar monomer to impart a polar functionality to the adhesive. Suitable polymer backbones include thermoplastic materials such as polyethylene (especially high density polyethylene), polypropylene, copolymers of ethylene with other alpha-olefins (for example, linear low density polyethylene) copolymers of propylene with other alpha-olefins, copolymers of ethylene with ethylenically unsaturated esters and their derivatives (for example, ethylene vinyl acetate), and mixtures including any of these polymers. Of these, the more rigid polymers are preferred including high density polyethylene and polypropylene.

Typical functional moieties which can be reacted with the polymer backbone to impart polarity include unsaturated carboxylic acids; functional derivatives of the carboxylic acids including anhydrides, esters, and amides; metal salts of unsaturated carboxylic acids; and imides. Of these, maleic anhydride is especially preferred. The maleic anhydride or other functional moiety can be thermally grafted, solution polymerized or otherwise reacted onto the polymer backbone at a concentration of about 0.01–15% by weight of the polymer backbone, preferably about 0.5–10% by weight of the polymer backbone, most preferably about 1–5% by weight of the polymer backbone. Overall, the active ingredient (defined as polyolefin reacted with functional moiety) constitutes about 1–97% by weight of the adhesive composition, with preferred amounts varying depending on the amount and type of the functional moiety reacted with the polymer backbone.

The adhesive composition used in the invention also contains a particulate filler which stiffens and rigidifies the adhesive. The particulate filler can be inorganic or organic, and can constitute about 3–75% by weight of the total adhesive composition, preferably about 6–45% by weight, most preferably about 10–20% by weight. The filler particles should have an average particle diameter of about 0.1–100 microns, preferably about 0.5–50 microns, most preferably about 1–10 microns. If the average particle size is too large, the adhesive composition will not be easily extruded. If the average particle size is too small, the filler will behave like clumps of dust and will be difficult to disperse in the polymer.

Particulate fillers include, but are not limited to, talc, mica, alumina, wallastonite, clay, glass spheres, silica, titania, wood flour, and mixtures including one or more of these. Talc is the presently preferred filler, with purified or highly pure talc being most preferred. Such highly purified talc is often referred to as "China" talc. Other fillers are less preferred, such as calcium carbonate, magnesium carbonate, barium sulfate, and other reactive fillers. An important feature of the filler is that it not be permitted to react excessively with the polar functional moiety in the adhesive. One way to minimize or prevent such reactions is to select a filler (e.g. glass spheres or talc) which is relatively chemically inert to the polar functional moiety. Another way is to coat an otherwise reactive filler with a less reactive or inert material (e.g. stearic acid, behenic acid, mineral oil or another coating) which physically shields the filler from the polar functional moiety. Some reaction between the filler and polar functional moiety is acceptable, so long as the adhesion of the adhesive composition to the nails or other fasteners is not substantially impaired.

The adhesive composition may optionally contain one or more additional thermoplastic polyolefin-type polymers and copolymers which are not reacted with a polar functional moiety. The unreacted polymer may simply serve as a diluent for the reacted polymer, and may include any of the polymers listed above as polymer backbones. The unreacted polymer may also serve as an adhesion promoter, and may include soft or rubbery materials such as ethylene-propylene rubber, butene-1 polymers and copolymers, ethylene vinyl acetate, and other soft materials. When used, the optional additional polymer or polymers may constitute about 1–96% by weight of the adhesive composition.

Whether or not an unreacted polymer is used, and how much, will depend on the strength and amount of the polar functional moiety reacted with the backbone polymer in the active ingredient (which affects how much, if any, the active ingredient can be diluted). Also important are the type and level of filler used (which affects how much, if any, the filler interacts with the active ingredient). Generally, the amounts and types of the active ingredient, filler and unreacted polymer (if any) should be selected so that the amount of the functional polar moiety in the active ingredient, which is available for chemically bonding to the metal oxide surface of the fasteners (i.e. which is not reacted with the filler) constitutes about 0.01–1.5% by weight of the overall adhesive composition. Preferably, the amount of the polar functional moiety will be about 0.02–1.0% by weight of the adhesive composition, most preferably about 0.03–0.50% by weight.

Several known extrudable adhesives do not contain a filler component, and are therefore not part of this invention.

However, some of these adhesives can be mixed with a filler in the amounts stated above, to create an adhesive composition useful in the fastener assembly of the invention. Examples of these known extrudable adhesives include PRIMACOR® which is a family of low modulus, low density resins prepared by copolymerizing acrylic acid with ethylene and available from Dow Chemical Co.; graft-modified polyolefins blended with hydrocarbon elastomers, as described in U.S. Pat. No. 4,198,327 (incorporated herein by reference); BYNEL® CXA, which is an anhydride-modified high density polyethylene available from E. I. du Pont de Nemours, Inc. ("DuPont"); BYNEL® E205, which is a chemically modified linear low density polyethylene available from DuPont; ADMER® NF500 and NF550, which are chemically modified high density polyethylene-based resins available from Mitsui Petrochemical Industries (Tokyo, Japan); PLEXAR® 6, which is a chemically modified and rubber modified high density polyethylene-based resin available from Quantum Chemical Corp. (Cincinnati, Ohio); and IGETABOND® E and G, which are chemically modified polyolefins available from Sumitomo Chemical Co. of Osaka, Japan. One very useful adhesive is a polar moiety-containing high density polyethylene adhesive sold by Morton Chemical under the name TYMOR®. Again, these extrudable adhesives do not contain a filler as sold, but can be mixed with fillers to make adhesive compositions within the invention.

The production of polar functionalized resins is also well known in the art, and all known techniques are available for use in accordance with the present invention. Polyolefins, for example, can be modified with unsaturated acids or acid anhydrides by various grafting processes, such as grafting high-density polyethylene with unsaturated bridged dicarboxylic acid anhydrides (as taught for example, by U.S. Pat. Nos. 4,087,587, 4,087,588, and 4,298,712, each of which is incorporated herein by reference). One acceptable technique involves grafting acrylic acid moieties on gamma irradiated low-density polyethylenes to produce adhesives for metals.

Fastener strips of this invention may be prepared by any convenient means. It is presently preferred to assemble these fastener strips by pressure applying heated nails to a connecting tape having a filled adhesive layer or by pressure-applying such a tape to the heated nails. In one preferred procedure, a coating of an adhesive composition comprising functionalized, thermoplastic hot melt adhesive resin and inert rigidifying agent is first extruded in its molten state onto a backing member, and allowed to cool. The adhesive coating preferably has a thickness of about 4–15 mils.

To make a fastener strip using such a tape, a plurality of substantially identical shanked fastener members (as above described) is heated to a temperature in the range where the adhesive is softened and where the polar functionality of the adhesive is chemically activated. Next, each heated fastener is impressed transversely and uniformly into the adhesive layer of the connecting tape. Each adhered shank is thus in the preferred spaced, parallel, aligned relationship with the shanks of adjacent fasteners, as described above particularly in reference to FIG. 1.

The impressing procedure characteristically produces a raised region of adhesive on either side of the shank of each nail or fastener with the adhesive being bonded to each fastener member in regions of contact. A present preference is to prepare preliminarily a group of nails which are all held in a spaced, parallel aligned relationship to one another and which are all uniformly heated prior to impressing them as a group into the connecting tape.

Heating levels and mounting pressures applied to the fasteners vary depending upon many variables such as nail size, adhesive layer filler characteristics, extent of bonding desired between individual fasteners and the adhesive layer, natures of the fasteners, the adhesives, the backing members, and the like. It is not possible to give exact heating and pressing conditions applicable to all possible fastener strip structures of the present invention. Nevertheless, such parameters will be known to those skilled in the art for any particular application in view of the teachings contained herein.

A fastener strip made in accordance with the present invention offers improved properties over strips collated with prior art adhesive tapes. In particular, the present invention provides for a strip with reduced shear requirements, increase rigidity and less bending and buckling during use. Referring to FIG. 1, the reduced shear requirements make it easier to break the leading nail from the strip 50, and drive it into the wood, when the driving force is applied at the location corresponding to the arrow B. The increased rigidity makes it possible to drive the strip of nails forward more rapidly in the magazine of the nail gun, without bending or buckling the strip, by applying an increased force corresponding to the arrow A at the tail end of the strip. Overall, these advantages permit the use of faster driving tools having reduced cycle times and economical energy requirements.

The following examples illustrate the reduced shear (and, consequently, reduced energy) requirements of using a faster assembly of the invention, compared to a prior art fastener assembly.

EXAMPLES 1 AND 2

To make the nail assembly of Example 1, an extrudable high density polar moiety-containing polyolefin-based adhesive resin sold under the trade designation TYMOR®, available from Morton Chemical Co., was charged in pellet form to an extruder. The adhesive resin was heated to a molten temperature in the extruder, and was then extruded through a die slot as a continuous molten film. The molten film was applied to a moving substrate comprising a continuous sheet of kraft paper, to produce an adhesive-coated tape.

The adhesive-coated tape was then applied to a row of at least twenty heated nails arranged in a spaced parallel configuration in a rack. The tape was applied to both sides of row of heated nails with the adhesive side touching the nails. Then, the tapes on both sides of the nails were uniformly pressed toward the nails, causing the shanks of the nails to impress the adhesive layer of each strip. The resulting nail assembly was then cooled and removed from the rack. The adhesive film thickness was 9.5–12 mils, applied on each side of the row of nails.

To make the nail assembly of Example 2, the TYMOR® adhesive was initially mixed with about 15% talc based on the combined weight of talc and adhesive, to form a filled adhesive composition according to the invention. Except for this additional step, the procedure used for Example 1 was followed to make the nail assembly of Example 2.

The nail assemblies of Examples 1 and 2 were tested to determine the breakaway shear energy required to remove individual nails from the assembly. Each nail assembly was loaded into a conventional Izod impact tester fitted with a vertically clamping drill vise, so that only one nail at a time would protrude from the vise. The vise was precisely positioned along the arc path of the pendulum so that the protruding nail was in direct line with the outermost portion of the pendulum frame. The pendulum was cocked and released, striking the nail as it passed through the bottom of its arc. The impact speed was approximately 11 feet per second.

Measurement of energy was taken the same way as if performing a standard Izod impact test i.e., by reading the foot-pound scale on the instrument. The value read, however, was slightly lower than actual, because the point of Impact on the pendulum is approximately 12% lower than standard. Therefore values read off the energy scale are multiplied by 1.12 to obtain true foot pound values.

Numerous nails were sequentially removed from the nail assembly of Example 1, and then from the nail assembly of Example 2. The following results in foot-pounds of shear were observed for the first sixteen nails removed from each nail assembly.

| Nail No. In Sequence | Force (ft-pounds) for Example 1 | Force (ft-pounds) for Example 2 |
| --- | --- | --- |
| 1 | 0.74 | 0.25 |
| 2 | 0.58 | 0.28 |
| 3 | 0.63 | 0.25 |
| 4 | 0.49 | 0.25 |
| 5 | 0.80 | 0.25 |
| 6 | 0.85 | 0.26 |
| 7 | 0.57 | 0.22 |
| 8 | 0.63 | 0.24 |
| 9 | 0.65 | 0.27 |
| 10 | 0.66 | 0.21 |
| 11 | 0.57 | 0.20 |
| 12 | 0.50 | 0.26 |
| 13 | 0.59 | 0.25 |
| 14 | 0.45 | 0.24 |
| 15 | 0.44 | 0.28 |
| 16 | 0.67 | 0.25 |
| Average | 0.61 | 0.25 |

As shown above, a substantial reduction in shear is achieved with the nail assembly of the invention. More particularly, only about 40% of the shear force is required to remove the nails in accordance with the present invention as compared to the shear force required to remove the nails collated according to Example 1. As will be appreciated by those skilled in the art, minimizing the energy needed to shear the fastener from the backing member leaves more energy to propel the fastener into the wood (or other medium), and permits greater driving speed and shorter cycle time, and/or the use of a lighter weight driving tool. This is a therefore highly desirable and unexpected result.

Samples of the nail assemblies from Examples 1 and 2 were then installed and tested in the same driving tool. The nail assembly of Example 2 exhibited no bending or buckling in the magazine, or misalignment at the point of driving. The nail assembly of Example 1 exhibited bending and buckling, and as many as 50% of the nails were misaligned at the point of driving.

While the embodiments of the invention disclosed herein are presently considered preferred, various improvements and modifications can be made without departing from the spirit and scope of the invention. The scope of the invention is indicated in the appended claims, and all changes that fall within the meaning and range of equivalents are intended to be embraced therein.

We claim:

1. A fastener assembly for use in a fastener driving tool, comprising:

a row of fasteners arranged substantially parallel to each other; and an extrudable adhesive composition bonded to the fasteners and maintaining them in the substantially parallel arrangement in the row;

the adhesive composition including at least an extrudable polymer backbone which has been reacted with a polar moiety, and about 3–75% of a particulate filler based on the weight of the adhesive composition.

2. The fastener assembly of claim 1, wherein the adhesive composition is in the form of a strip bonded to at least one side of the row of fasteners.

3. The fastener assembly of claim 1, wherein the adhesive composition is in the form of strips bonded to both sides of the row of fasteners.

4. The fastener assembly of claim 2, further comprising an outer backing layer bonded to an outer surface of the strip of adhesive composition.

5. The fastener assembly of claim 3, further comprising outer backing layers bonded to outer surfaces of the strips of adhesive composition.

6. The fastener assembly of claim 1, wherein the row of fasteners comprises nails.

7. The fastener assembly of claim 1, wherein the adhesive composition comprises about 6–45% by weight of the filler.

8. The fastener assembly of claim 1, wherein the adhesive composition comprises about 10–50% by weight of the filler.

9. The fastener assembly of claim 1, wherein the filler comprises particles of a material selected from the group consisting of talc, mica, alumina, wallastonite, clay, glass spheres, silica, titania, wood flour, and mixtures thereof.

10. The fastener assembly of claim 1, wherein the filler comprises talc.

11. The fastener assembly of claim 1, wherein the filler comprises a coated particulate material.

12. The fastener assembly of claim 11, wherein the filler coating is substantially chemically inert to the polar moiety.

13. The fastener assembly of claim 1, wherein the polymer backbone comprises a thermoplastic material selected from the group consisting of polyethylene, polypropylene, copolymers of ethylene with other alpha-olefins, copolymers of propylene with other alpha-olefins, copolymers of ethylene with ethylenically unsaturated esters and their derivatives, and mixtures of the foregoing.

14. The fastener assembly of claim 1, wherein the polymer backbone comprises high density polyethylene.

15. The fastener assembly of claim 1, wherein the polar moiety comprises a compound selected from the group consisting of unsaturated carboxylic acids; functional derivatives of carboxylic acids including anhydrides, esters and amides; metal salts of unsaturated carboxylic acids; and imides.

16. The fastener assembly of claim 1, wherein the polar moiety comprises maleic anhydride.

17. A fastener assembly for use in a fastener driving tool, comprising:

a row of fasteners arranged in a substantially flat, planar configuration; and an extrudable adhesive composition bonded to the fasteners and maintaining them in the row;

the extrudable adhesive composition including an active ingredient functionalized with a polar moiety, and about 3–75% of a particulate filler based on the weight of the adhesive composition;

the filler being substantially chemically inert to the polar moiety.

18. The fastener assembly of claim 17, wherein the active ingredient comprises a thermoplastic polymer backbone functionalized with the polar moiety.

19. The fastener assembly of claim 17, wherein the filler constitutes about 6-45% by weight of the adhesive composition.

20. The fastener assembly of claim 17, wherein the filler constitutes about 10-20% by weight of the adhesive composition.

21. The fastener assembly of claim 17, wherein the filler comprises a particulate material which is substantially chemically inert to the polar moiety.

22. The fastener assembly of claim 17, wherein the filler comprises a particulate material whose particles are coated with a substance that is substantially chemically inert to the polar moiety.

23. The fastener assembly of claim 17, wherein the filler has an average particle diameter of about 0.1-100 microns.

24. The fastener assembly of claim 17, wherein the filler has an average particle diameter of about 0.5-50 microns.

25. The fastener assembly of claim 17, wherein the filler has an average particle diameter of about 1-10 microns.

26. The fastener assembly of claim 18, wherein the adhesive composition further comprises a thermoplastic polymer not reacted with a polar moiety.

* * * * *